United States Patent
Singh

(10) Patent No.: US 7,083,819 B2
(45) Date of Patent: *Aug. 1, 2006

(54) PROCESS FOR MANUFACTURING A SOY PROTEIN CONCENTRATE HAVING HIGH ISOFLAVONE CONTENT

(75) Inventor: Navpreet Singh, Fort Wayne, IN (US)

(73) Assignee: Solae, LLC, St. Louis, MO (US)

( * ) Notice: Subject to any disclaimer, the term of this patent is extended or adjusted under 35 U.S.C. 154(b) by 92 days.

This patent is subject to a terminal disclaimer.

(21) Appl. No.: 10/688,604

(22) Filed: Oct. 17, 2003

(65) Prior Publication Data

US 2004/0170748 A1  Sep. 2, 2004

Related U.S. Application Data

(62) Division of application No. 10/118,764, filed on Apr. 18, 2002, now Pat. No. 6,818,246.

(60) Provisional application No. 60/282,520, filed on Apr. 9, 2001.

(51) Int. Cl.
*A23L 1/20* (2006.01)

(52) U.S. Cl. ............... 426/459; 426/656; 426/634; 426/431; 426/495; 426/507; 426/456

(58) Field of Classification Search ........... 426/634, 426/656, 431, 495, 507, 456, 459
See application file for complete search history.

(56) References Cited

U.S. PATENT DOCUMENTS

| | | | |
|---|---|---|---|
| 4,420,425 A | 12/1983 | Lawhon | |
| 5,086,166 A | 2/1992 | Lawhon et al. | |
| 5,702,752 A | 12/1997 | Gugger et al. | |
| 5,792,503 A | 8/1998 | Gugger et al. | |
| 5,858,449 A | 1/1999 | Crank et al. | |
| 5,936,069 A | 8/1999 | Johnson | |
| 5,994,508 A | 11/1999 | Bryan et al. | |
| 6,313,273 B1 * | 11/2001 | Thomas et al. | 530/378 |
| 2002/0098276 A1 | 7/2002 | Porter et al. | |
| 2002/0102346 A1 | 8/2002 | Stark et al. | |
| 2002/0106437 A1 | 8/2002 | Karleskind et al. | |
| 2002/0106440 A1 | 8/2002 | Porter et al. | |
| 2002/0114877 A1 | 8/2002 | Stark et al. | |

* cited by examiner

*Primary Examiner*—Anthony Weier
(74) *Attorney, Agent, or Firm*—James L. Cordek; Holly M. Amjad; Cary A. Levitt

(57) ABSTRACT

A method for manufacturing a soy protein concentrate having a low non-digestible oligosaccharide and high isoflavone content. The soy protein may have high saponin content. The method includes the use of a membrane in an ultrafiltration process to separate non-digestible oligosaccharides from protein, while retaining isoflavones and saponins with protein. The soy protein concentrate with a low non-digestible oligosaccharide and high isoflavone and saponin content is useful as a milk substitute and in drink mixes as well as an ingredient in other nutrition and health products.

24 Claims, No Drawings

PROCESS FOR MANUFACTURING A SOY PROTEIN CONCENTRATE HAVING HIGH ISOFLAVONE CONTENT

CROSS REFERENCE TO RELATED APPLICATIONS

This is a divisional of application Ser. No. 10/118,764 filed on Apr. 18, 2002 now U.S. Pat. No. 6,818,246, which claims the benefit under Title 35, U.S.C. § 119(e) of U.S. Provisional Patent Application Ser. No. 60/282,520, entitled LOW OLIGOSACCHARIDE SOY PROTEIN CONCENTRATE AND PROCESS FOR ITS MANUFACTURE, filed on Apr. 9, 2001.

BACKGROUND OF THE INVENTION

1. Field of the Invention

This invention relates to a soy protein concentrate that has desirable flavor, functional and nutritional properties.

2. Description of the Related Art

The benefits of soy protein are well documented. Cholesterol is a major concern with consumers throughout the industrialized world. It is well known that vegetable products contain no cholesterol. For decades, nutritional studies have indicated that the inclusion of soy protein in the diet actually reduces serum cholesterol levels in people who are at risk. The higher the cholesterol, the more effective soy proteins are in lowering that level.

Soybeans have the highest protein content of all cereals and legumes. In particular, soybeans have about 40% protein, while other legumes have 20–30%, and cereals have about 8–15% protein. Soybeans also contain about 20% oil with the remaining dry matter mostly carbohydrate (35%). On a wet basis (as is), soybeans contain about 35% protein, 17% oil, 31% carbohydrates, and 4.4% ash.

In the soybean, both storage protein and lipid bodies are contained in the usable meat of the soybean (called the cotyledon). The complex carbohydrate (or dietary fiber) is also contained in the cell walls of the cotyledon. The outer layer of cells (called the seed coat) makes up about 8% of the soybean's total weight. The raw, dehulled soybean is, depending on the variety, approximately 18% oil, 15% soluble carbohydrates, 15% insoluble carbohydrates, 14% moisture and ash, and 38% protein.

In processing, soybeans are carefully selected for color and size. The soybeans are then cleaned, conditioned (to make removal of the hull easier) and cracked, dehulled and rolled into flakes. The flakes are subjected to a solvent bath that removes the oil. The solvent is removed and the flakes are dried, creating the defatted soy flakes that are the basis of all soy protein products. Despite the large number of products on the market, there are only three types of soy protein products: flours, concentrates and isolates.

Soy flours are high in oligosaccharides and have a "beany" flavor that may be objectionable to some consumers. The lack of optimized processing makes soy flours highly variable in terms of quality.

Soy flours and grits are still widely produced and are used most often in baked goods, snack foods and pet foods applications where the high flavor profile does not pose a problem. Textured soy flours were an early attempt at simulating or enhancing the texture of meat products. Texturizing does not change the composition of soy flours and reduces the flavor profile only slightly. Their primary applications are inexpensive meat products or pet foods.

The oligosaccharides, raffinose and stachyose, in soy flour potentially cause flatulence as their bacterial fermentation in the colon creates intestinal gas. Suarez reported that ingestion of 34 grams (g) of conventional soy flour (1.3 g raffinose and stachyose) caused no significant increase in flatulence frequency, whereas ingestion of 80 g of conventional soy flour (3.1 g raffinose and stachyose) resulted in a significant increase in flatulence frequency. Surarez, Fabrizis L. et al., Am. J. Clin. Nutr., 69:135–9 (1999).

Soy concentrates have at least 65% protein. A myriad of applications have been developed for soy concentrates and texturized concentrates in processed foods, meat, poultry, fish, cereal and dairy systems. Soy protein concentrates are made by removing soluble carbohydrate material from defatted soy meal. The most common means for carbohydrate removal is aqueous alcohol extraction (60–80% ethanol) or acid leaching (isoelectric pH 4.5). In both aqueous alcohol extraction and acid leaching, however, essentially all of the protein is rendered insoluble. Protein solubility may be recovered in acid leach products by neutralization.

Isolates are produced through standard chemical isolation, drawing the protein out of the defatted flake through solubilization (alkali extraction at pH 7–10) and separation followed by isoelectric precipitation. As a result, isolates are 90% protein on a moisture-free basis. They contain no dietary fiber and are sometimes high in sodium, properties that can limit their application. Their major applications have been in dairy substitution, as in infant formulas and milk replacers.

It is known that a soy protein product having a substantially bland taste and colorless appearance may be produced by filtration using a membrane having a molecular weight cut off (MWCO) of 70,000.

In recent years, researches have been conducted to better understand the role of isoflavones in chronic disease prevention. According to the American Institute for Cancer Research, isoflavones may inhibit enzymes necessary for the growth and the spread of many types of cancer such as breast cancer, prostate cancer and colon cancer. Isoflavones also have shown great promise in preventing osteoporosis and treating menopausal symptoms.

Soybeans contain about 0.5% by weight saponins. Soy saponins have been the subject of investigation since the early $20^{th}$ century. These compounds consist of a triterpenoid skeleton with various sugar and acetyl moieties. The current consensus is that soyasapogenols A, B and E are true aglycons, while other soyasapogenols are artifacts of hydrolysis conditions. The corresponding glycosides are the so-called 'group A saponins', 'group B saponins', and 'group E saponins', respectively.

Soy saponins have demonstrated anti-mutagenic properties that make them promising agents for cancer prophylaxis. Moreover, group B soy saponins have exhibited pronounced suppressive effects on the replication in vitro of the human immunodeficiency virus (HIV). The chemical structure of soybean saponins is very similar to that of the compound glycyrrhizin, a known anti-viral agent, so soy saponins show promise as building blocks for the synthesis of anti-viral pharmaceutical compounds.

SUMMARY OF THE INVENTION

The present invention comprises a soy protein concentrate having low oligosaccharide and high isoflavone and saponin content. More specifically, the present invention comprises a method, using soy flour or soy flakes as a starting material, for producing soy protein concentrate having low non-digestible oligosaccharides and high isoflavone and saponin content.

It is an objective of the present invention to produce soy protein concentrates having a protein content of more than 70 wt. % and less than 90 wt. % of total dry matter, and an isoflavone content of at least 2 milligrams/gram (mg/g) of total dry matter.

It is another objective of the present invention to produce soy protein concentrates containing a combined raffinose and stachyose content of less than about 50 mg/g of total dry matter.

It is a further objective of the present invention to produce soy protein concentrates having a soyasapogenol content of more than 2.0 mg/g of total dry matter.

It is yet a further objective of the present invention to produce soy protein concentrates having a high Nitrogen Solubility Index (NSI).

In one embodiment, the present invention provides a method for manufacturing a soy protein concentrate that comprises the steps of: (a) providing a defatted soybean material, (b) adding water to the material to form a slurry, (c) removing fiber from the slurry to produce a suspension, and (d) ultrafiltering the suspension using a membrane having a molecular weight cutoff (MWCO) of up to 30,000. Preferably, a membrane having a MWCO of between 10,000 and 30,000 is used. Alternatively, a membrane having a MWCO of 1,000,000 may be used to remove oligosaccharides and to produce a product having a protein content of at least 70 wt. % of total dry matter and an isoflavone content of at least 2 mg/g of total dry matter.

The defatted soybean material may be soy flakes or soy flour. The defatted material may contain less than about 1.0 wt. % fat, at least 45 wt. % protein and have a protein dispersibility index (PDI) of about 90. The defatted material may further contain about 30 to 40 wt. % carbohydrates, and about 5 to 10 wt. % moisture.

In one specific form of the present invention, an amount of water is added to the defatted material to produce a slurry that contains about 5 to 15 wt. % solids.

In another specific form of the present invention, a membrane having a molecular weight cutoff of 10,000 is used in the step of ultrafiltering the suspension.

In one specific embodiment, the method for manufacturing a soy protein concentrate further comprises the step of recovering a product having a protein content of at least 70% of total dry matter and an isoflavone content of at least 2 mg/g of total dry matter. The product further contains a combined raffinose and stachyose content of less than 50 mg/g of total dry matter.

In another embodiment of the present invention, the method for manufacturing a soy protein concentrate includes a step of adjusting the pH of the slurry to at least about 7.0, prior to the step of removing the fiber. Specifically, the pH of the slurry can be adjusted to between about 7 to about 7.5. More specifically, the pH of the slurry is adjusted by adding sodium hydroxide to the slurry.

In another specific embodiment, the method for manufacturing a soy protein concentrate further comprises a step of spray drying the product.

In yet another specific embodiment, the method for manufacturing a soy protein concentrate further comprises a step of pasteurizing the product prior to spray drying the product. The step of pasteurizing the product may be accomplished by jet cooking at a temperature of between about 76° C. and about 130° C.; preferably a temperature of above about 93° C. is used.

In another specific embodiment, the method for manufacturing a soy protein concentrate further comprises a step of pasteurizing the suspension prior to the ultrafiltration step.

In a more specific embodiment of the present invention, the method for manufacturing a soy protein concentrate comprises the steps of (a) providing a defatted soybean material, (b) adding water to the material to form a slurry, wherein the slurry has between about 5 and 15 wt. % solids, (c) adjusting the pH of the slurry to about 7 to 7.5 with sodium hydroxide, (d) removing fiber from the slurry by centrifugation to produce a suspension, (e) pasteurizing the suspension by jet cooking above the 115° C., (f) ultrafiltering the suspension using a membrane having a molecular weight cutoff (MWCO) of up to 30,000 to produce a retentate, (g) pasteurizing the retentate by jet cooking above about 93° C., (h) spray drying the pasteurized retentate to form a product, and (i) recovering the product having a protein content of at least 70 wt. % of total dry matter and at least 2 mg of isoflavones per g of total dry matter.

In a specific embodiment of the invention, the soy protein concentrate comprises a protein content of at least 70 wt. % of total dry matter and isoflavones of at least 2 mg/g of total dry matter. The soy protein concentrate may further comprise a combined raffinose and stachyose content of less than 50 mg/g of total dry matter. The soy protein concentrate may further comprise a crude fiber of less than 3 wt. % of dry matter. Further, the soy protein concentrate may comprise a soyasapogenol content of more than about 2.0 mg/g of total dry matter.

DETAILED DESCRIPTION

The present method generally encompasses: 1) dehulling whole soybeans; 2) flaking the dehulled soybeans; 3) extracting soybean oil from the flaked soybeans with a solvent; such as hexane; 4) desolventizing the defatted soybean flakes without high heating or toasting to produce "white" flakes; 5) grinding the flakes to make soy flour; 6) removing fiber from the soy flour and retaining proteins; and 7) ultrafiltering to remove carbohydrates and minerals.

Steps 1 through 4 described above are commonly referred to as the extraction process for soybeans. The general procedure for the above-described steps 1 through 5 is well understood. See U.S. Pat. No. 5,097,017 to Konwinski and U.S. Pat. No. 3,897,574 to Pass, each assigned to the assignee of the present invention, the disclosures of which are expressly incorporated herein by reference. See also "Extraction of Oil from Soybeans," *J. Am. Oil Chem. Soc.*, 58, 157 (1981) and "Solvent Extraction of Soybeans," *J. Am. Oil Chem. Soc.*, 55, 754 (1978).

The first step described above is dehulling. Dehulling is the process in which the soybean hulls are removed from the whole soybeans. The soybeans are carefully cleaned prior to dehulling to remove foreign matter, so that the final product will not be contaminated by color bodies. Soybeans also are normally cracked into about 6 to 8 pieces prior to dehulling. The hull typically accounts for about 8% of the weight of the whole soybean. The dehulled soybean is about 10% water, 40% protein, 20% fat, with the remainder mainly being carbohydrates, fiber and minerals.

The second step described above is the flaking process. Soybeans are conditioned prior to flaking by adjusting moisture and temperature to make the soybean pieces sufficiently plastic. The conditioned soybean pieces are passed through flaking rolls to form flakes of about 0.25 to 0.30 millimeters (mm) thick.

The third step described above involves removal of soybean oil from the flakes or defatting. This process is performed by contacting the flakes with hexane. The oil that is removed by this process may be used in margarine, shortening and other food products. The soybean oil is also a good source of lecithin, which has many useful applications as an emulsifier.

In the fourth step described above, the hexane-defatted soybean flakes are desolventized to remove hexane, without toasting, to produce white flakes. This is different than conventional soybean oil hexane processes where the flakes are toasted and used for animal feed.

In the fifth step described above, the white flakes are ground to make soy flour. Soy flour that can be used as a starting material for the subject invention is readily, commercially available. Commercial soy flour typically would have at least 50% (52.5%) protein (N×6.25); about 30–40% (34.6%) carbohydrates; about 5–10% (6%) moisture; about 5–10% (6%) ash; about 2–3% (2.5%) crude fiber; and less than about 1% (0.9%) fat (ether extract).

The soy flour may have a protein dispersibility index (PDI) of 90. PDI is determined by American Oil Chemist's Society (AOCS) method Ba 10-65. Soy flour having 90 PDI would be soy flour with no heat treatment and is enzyme active. The soy flour may be 80 mesh, which means that more than 95 wt. % of the soy flour passes through a number 80 mesh USA standard sieve.

According to one embodiment of the present invention, the starting material, which can be soy flour or soy flakes, is produced according to the process such as that described in steps 1–5 above.

The next step involves removing fiber from the starting material. In this step, an amount of water is added to the starting material to form a slurry. The water may be pre-heated to about 50° C. to about 65° C. In a specific embodiment, the slurry contains about 5–15 wt. % solids. It usually is necessary to provide some agitation or mixing to slurry the starting material. One means for performing the mixing is a propeller-type agitator.

In the step of fiber removal, the pH of the slurry is adjusted to about 7–7.5, and more preferably about 7.4. The pH may be adjusted by adding sodium hydroxide to the slurry.

The separation of fiber from the slurry can be performed by any one of a number of physical separation means, such as by centrifugation using a decanting centrifuge, for example. After the centrifugation, the cake containing fiber is separated from the suspension, which is collected.

In one embodiment of this invention, the suspension is pasteurized. One means for pasteurization is jet cooking at a high temperature, preferably, at a temperature of about 93° C. The temperature may reach about 127° C. In yet another embodiment of this invention, the suspension may be pasteurized in a steam-jacketed kettle.

In the next step, the suspension is ultrafiltered to remove oligosaccharides and other sugars while retaining isoflavones and saponins in the retentate. Isoflavones and saponins are small molecular weight components, less than 1500 in molecular weight. Surprisingly, however, it has been found that isoflavones and saponins are retained by the ultrafiltration membranes in the retentate. It is believed at this time that the isoflavones and saponins might complex with the proteins such that the majority of the isoflavones and saponins are retained in the retentate. Typically, about 75 wt. % of the feed volume is removed as permeate during the ultrafiltration, resulting in a retentate product having a protein content of at least about 70 wt. % of total dry matter. Preferably, the product contains protein at about 75 to 85 wt. % of total dry matter.

Any membrane including spiral-wound membranes with a MWCO of up to 30,000 is suitable for the ultrafiltration step. Preferably, a membrane with a MWCO of between 10,000 and 30,000 is used. Alternatively, a membrane with a MWCO of 1,000,000 may be used. Spiral-wound membranes of different MWCO are commercially and readily available. Suitable membranes are available from, for example, Koch Membrane Systems, Wilmington, Mass.; Osmonics, Minnetonka, Minn.; PTI Advanced Filtration, Oxnard, Calif.; and Synder Filtration, Vacaville, Calif.

During the ultrafiltration step, the temperature of the suspension can be lowered. One means of lowering the temperature is to include a heat exchanger in the ultrafiltration system and pass cold water through the heat exchanger. The heat exchanger may be installed prior to or after a pre-filter for the membrane system or within the membrane system itself.

The ultrafiltered product may be pasteurized before being dried. One means for pasteurization is jet cooking. In yet another embodiment of this invention, the product may be pasteurized in a steam-jacketed kettle. The pasteurization is performed so that the product achieves an acceptable microbial profile and tests negative for *salmonella*. The preferred means of drying is a vertical spray dryer with a high-pressure nozzle.

The product is dried to form a soy protein concentrate that contains isoflavones of at least 2 mg/g of total dry matter. The product has low non-digestible oligosaccharide content; the combined content of raffinose and stachyose is less than 50 mg/g of total dry matter. The product may further contain a high content of soyasapogenols, which may be at least about 2.0 mg/g of total dry matter.

The product has many uses. For example, it can be used as a milk substitute and in drink mixes and beverages, such as chocolate, vanilla and pineapple beverages; dairy products, such as fruit yogurt; nutrition and health products, such as protein bars; whole muscle meat injection; surimi products; emulsified meats; cereal products, such as breakfast cereals; bakery products, such as blueberry muffins and other liquid or dry beverage, food or nutritional products. The dried product may be coated with commercial lecithin or other food-grade surfactants, such as mono-diglycerides, to improve water dispersibility and reduce clumping of the product.

METHODS AND STANDARDS

1. Nitrogen Solubility Index (NSI) was measured according to American Oil Chemists' Method Ba 11-65.
2. Protein Dispensability Index (PDI) was measured according to American Oil Chemists' Method Ba 10-65.
3. Isoflavones were characterized by the procedure described in Thiagarajan, D. G., Bennink, M. R., Bourquin, L. D., and Kavas, F. A., Prevention of precancerous colonic lesions in rats by soy flakes, soy flour, genistein, and calcium, Am. J. Clin. Nutr. 1998; 68(suppl); 1394S-9S.
4. Saponins were analyzed using HPLC. An HPLC-based analytical method was developed and validated to estimate saponin precursors present in soybean. The method is based on isolation of total saponins from finely ground soybean or soybean products using an ethanolic extraction followed by acid hydrolysis to cleave the conjugated sugar chain(s) to form their aglycons (soyasapogenols). Resulting soyasapogenols were isolated and concentrated by solid phase extraction techniques. Soyasapogenols were resolved using a reverse phase column with isocratic elusions and detected using an Evaporative Light Scattering Detector (ELSD). The quantification of soyasapogenols was performed using the calibration curves derived against authentic compounds. The total soy saponin content is approximately twice the total soyasapogenol content (Duhan et al. (2001) *Int. J. Food Sci. Nutr.* 52:53–59).

The following non-limiting examples are presented to illustrate the invention, which is not to be considered as limited thereto. In the examples and throughout the specification, percentages are by weight unless otherwise indicated.

EXAMPLE 1

About 23 kilograms (50 pounds) of soy flour having a protein dispersibility index (PDI) of 86 was dispersed in 236 kilograms (519 pounds) of water to form a slurry. The pH was adjusted to about 7.5 using sodium hydroxide. The slurry was mixed for 30 minutes at a temperature of about 60° C., and then centrifuged in a decanting centrifuge. The insoluble centrifuge cake was discarded, and the supernatant (suspension) was heat treated by passing through a jet cooker at a temperature of about 121° C. with a holding time of 15 seconds. The suspension was then cooled to about 48.8° C. in a jacketed vessel. The suspension was then ultrafiltered using a 10,000 molecular weight cutoff (MWCO) spiral-wound membrane to remove about 75 wt. % of the feed volume as permeate. The retentate from the membrane was heat treated by passing though a jet cooker at a temperature about 93° C. with a holding time of 15 seconds. The retentate was then cooled to about 60° C. in a jacketed vessel and spray dried. The product was analyzed to determine the content.

The results from two runs (TABLE 1) show that the product has a protein content of between 79.79 and 82.97 wt. % of dry matter. The total isoflavone content is more than 2 mg/g of total dry matter and a combined amount of raffinose and stachyose is less than 3 wt. %. In addition, the NSI of the product was greater than 95% in both runs.

TABLE 1

Composition of product derived from the method of EXAMPLE 1

| Composition | wt. % | |
|---|---|---|
| | Run 1 | Run 2 |
| Protein | 79.79* | 82.97* |
| Moisture | 1.23 | 3.73 |
| Ash (as is) | 6.87 | 6.50 |
| Crude fiber (as is) | 0.80 | 0.80 |
| Monosaccharides (as is) | 0.13 | 0.06 |
| Sucrose (as is) | 2.88 | 3.49 |
| Melibiose (as is) | 0.00 | 0.44 |
| Raffinose (as is) | 0.18 | 0.32 |
| Stachyose (as is) | 1.80 | 2.40 |
| Total Isoflavones | 2.18** | 3.51** |
| Nitrogen Solubility Index (NSI) | 96.99 | 95.45 |

*dry wt basis (wt. %),
**dry wt basis (mg/g of total dry matter)

EXAMPLE 2

About 227 liters (60 gallons) of water were added to a mixing tank and heated to 60° C. Then, about 45 kilograms (100 pounds) of soy flakes were added to the mixing tank to form a slurry. The pH of the slurry was adjusted to about 7.1, using about 1400 ml of 4.5% NaOH solution. The slurry was mixed for 10 minutes at a temperature of about 55° to about 58° C. and then transferred to a centrifuge feed tank, which contained about 303 liters (80 gallons) of water preheated to a temperature of about 60° C. The diluted slurry was mixed for about 20 minutes at a temperature of about 55° to about 58° C. and thereafter fed at a rate of about 7.6 liters (2 gallons) per minute to a Sharples scroll-type centrifuge. The supernatant (suspension) was jet cooked at a temperature of about 127° C. The jet-cooked suspension was transferred to a membrane feed tank through a 100-mesh strainer. About 10 grams of sodium metabisulfite was added to the membrane feed tank. The suspension was fed to an ultrafiltration membrane system containing a spiral-wound membrane with a MWCO of 10,000. The temperature of the suspension was maintained at about 26.5°–26.8° C. during membrane processing. About 75% of the original feed volume added to the membrane feed tank was removed as permeate. The retentate from the membrane system was pasteurized at about 76.7° C. and spray dried using a high-pressure pump feeding a spray nozzle in a vertical spray dryer. The dried product was analyzed to determine the content thereof. The results of the analysis are shown in TABLE 2.

TABLE 2

Composition of product derived from the method of EXAMPLE 2

| Composition | wt. % | mg/g of total dry matter |
|---|---|---|
| protein | 82.73 | |
| crude fiber | 0.94 | |
| crude fat | 0.01 | |
| ash | 5.91 | |
| fructose | | 2.90 |
| galactose | | 1.33 |
| sucrose | | 40.29 |
| raffinose | | 6.88 |
| stachyose | | 30.13 |
| isoflavones | | 4.54 |
| daidzin | | 0.77 |
| glycitin | | 0.22 |
| genistin | | 1.00 |
| 6"-O-malonyldaidzin | | 0.91 |
| 6"-O-malonylglycitin | | 0.16 |
| 6"-O-acetyl genistin | | 0.12 |
| 6"-O-malonylgenistin | | 1.24 |
| daidzein | | 0.05 |
| genistein | | 0.07 |
| soyasapogenols | 4.06 | |
| soyasapogenol A | | 1.25 |
| soyasapogenol B | | 2.81 |
| Nitrogen Solubility Index (NSI) | 92 | |

EXAMPLE 3

About 227 liters (60 gallons) of water were added to a mixing tank and heated to a temperature of about 60° C. Then, about 45 kilograms (100 pounds) of soy white flakes were added to the mixing tank to form a slurry. The pH of the slurry was adjusted to about 7.08, using about 1400 ml of 4.5% NaOH solution. The slurry was mixed for 10 minutes at a temperature of about 55° to about 58° C. and then transferred to a centrifuge feed tank, which contained about 303 liters (80 gallons) of water preheated to a temperature of about 60° C. The diluted slurry was mixed for about 20 minutes at a temperature of about 55° to about 58° C. and thereafter fed at a rate of about 7.6 liters (2 gallons) per minute to a Sharples scroll-type centrifuge. The supernatant (suspension) was jet cooked at a temperature of about 127° C. The jet-cooked suspension was transferred to a membrane feed tank through a 100-mesh strainer. The suspension was fed to an ultrafiltration membrane system containing a spiral-wound membrane with a MWCO of 10,000. The temperature of the suspension was maintained at about 48.8° to about 49° C. during membrane processing. About 75% of the original feed volume added to the membrane feed tank was removed as permeate. The retentate from the membrane system was pasteurized at a temperature of about 76.7° C. and spray dried using a high-pressure pump feeding a spray nozzle in a vertical spray dryer. The dried product was analyzed to determine the content thereof. The results of the analysis are shown in TABLE 3.

TABLE 3

Composition of product derived from the method of EXAMPLE 3

| Composition | wt. % | mg/g of total dry matter |
|---|---|---|
| protein | 82.81 | |
| crude fiber | 0.84 | |
| crude fat | 0.13 | |
| ash | 6.00 | |
| fructose | | 2.72 |
| galactose | | 1.21 |
| sucrose | | 30.11 |
| raffinose | | 4.99 |
| stachyose | | 21.80 |
| isoflavones | | 3.54 |
| daidzin | | 0.67 |
| glycitin | | 0.09 |
| genistin | | 0.90 |
| 6"-O-malonyldaidzin | | 0.61 |
| 6"-O-malonylglycitin | | 0.08 |
| 6"-O-acetyl genistin | | 0.16 |
| 6"-O-malonylgenistin | | 0.96 |
| daidzein | | 0.03 |
| genistein | | 0.04 |
| soyasapogenols | 3.98 | |
| soyasapogenol A | | 1.05 |
| soyasapogenol B | | 2.93 |
| Nitrogen Solubility Index (NSI) | 93.8 | |

EXAMPLE 4

About 227 liters (60 gallons) of water were added to a mixing tank and heated to a temperature of about 60° C. Then, about 45 kilograms (100 pounds) of soy flour were added to the mixing tank to form a slurry. The pH of the slurry was adjusted to about 7.08, using about 1400 ml of 4.5% NaOH solution. The slurry was mixed for 10 minutes at a temperature of about 55° to about 58° C. and then transferred to a centrifuge feed tank, which contained about 303 liters (80 gallons) of water preheated to a temperature of about 60° C. The diluted slurry was mixed for about 20 minutes at a temperature of about 55° to about 58° C. and thereafter fed at a rate of about 7.6 liters (2 gallons) per minute to a Sharples scroll-type centrifuge. The supernatant (suspension) was jet cooked at a temperature of about 127° C. The jet-cooked suspension was transferred to a membrane feed tank through a 100-mesh strainer. The suspension was fed to an ultrafiltration membrane system containing a spiral-wound membrane with a MWCO of 30,000. The temperature of the suspension was maintained at about 48.8° to about 49° C. during membrane processing. About 75% of the original feed volume added to the membrane feed tank was removed as permeate. The retentate from the membrane system was pasteurized at a temperature of about 76.7° C. and spray dried using a high-pressure pump feeding a spray nozzle in a vertical spray dryer. The dried product was analyzed to determine the content thereof. The results of the analysis are shown in TABLE 4.

TABLE 4

Composition of product derived from the method of EXAMPLE 4

| Composition | wt. % | mg/g of total dry matter |
|---|---|---|
| protein | 82.31 | |
| crude fiber | 1.14 | |
| crude fat | 0.01 | |
| ash | 5.44 | |
| fructose | | 2.79 |
| galactose | | 1.60 |
| sucrose | | 33.14 |
| raffinose | | 5.88 |
| stachyose | | 24.24 |
| isoflavones | | 3.53 |
| daidzin | | 0.60 |
| glycitin | | 0.17 |
| genistin | | 0.70 |
| 6"-O-malonyldaidzin | | 0.76 |
| 6"-O-malonylglycitin | | 0.11 |
| 6"-O-acetyl genistin | | 0.09 |
| 6"-O-malonylgenistin | | 0.99 |
| daidzein | | 0.04 |
| genistein | | 0.07 |
| soyasapogenols | 3.74 | |
| soyasapogenol A | | 1.04 |
| soyasapogenol B | | 2.70 |
| Nitrogen Solubility Index (NSI) | 89.2 | |

EXAMPLE 5

About 227 liters (60 gallons) of water were added to a mixing tank and heated to a temperature of about 60° C. Then, about 45 kilograms (100 pounds) of soy flour were added to the mixing tank to form a slurry. The pH of the slurry was adjusted to about 7.0, using about 1400 ml of 4.5% NaOH solution. The slurry was mixed for 10 minutes at a temperature of about 55° to about 58° C. and then transferred to a centrifuge feed tank, which contained about 303 liters (80 gallons) of water preheated to a temperature of about 60° C. The diluted slurry was mixed for about 20 minutes at a temperature of about 55° to about 58° C. and thereafter fed at a rate of about 7.6 liters (2 gallons) per minute to a Sharples scroll-type centrifuge. The supernatant (suspension) was jet cooked at a temperature of about 127° C. The jet-cooked suspension was transferred to a membrane feed tank through a 100-mesh strainer. The suspension was fed to an ultrafiltration membrane system containing a spiral-wound membrane with a MWCO of 1,000,000. The temperature of the suspension was maintained at about 48.8° to about 49° C. during membrane processing. About 75% of the original feed volume added to the membrane feed tank was removed as permeate. The retentate from the membrane system was pasteurized at a temperature of about 76.7° C. and spray dried using a high-pressure pump feeding a spray nozzle in a vertical spray dryer. The dried product was analyzed to determine the content thereof. The results of the analysis are shown in TABLE 5.

TABLE 5

Composition of product derived from the method of EXAMPLE 5

| Composition | wt. % | mg/g of total dry matter |
|---|---|---|
| protein | 82.32 | |
| crude fiber | 1.25 | |
| crude fat | 0.07 | |
| ash | 5.72 | |
| fructose | | 2.78 |
| galactose | | 1.38 |
| sucrose | | 36.44 |
| raffinose | | 6.82 |
| stachyose | | 26.07 |
| isoflavones | | 3.37 |
| daidzin | | 0.54 |
| glycitin | | 0.16 |
| genistin | | 0.69 |
| 6''-O-malonyldaidzin | | 0.74 |
| 6''-O-malonylglycitin | | 0.11 |
| 6''-O-acetyl genistin | | 0.10 |
| 6''-O-malonylgenistin | | 0.98 |
| daidzein | | 0.02 |
| genistein | | 0.03 |
| soyasapogenols | 3.55 | |
| soyasapogenol A | | 1.04 |
| soyasapogenol B | | 2.51 |
| Nitrogen Solubility Index (NSI) | 90.7 | |

What is claimed is:

1. A method for producing a soy protein concentrate, comprising the steps of:
    (a) providing a substantially defatted soybean material;
    (b) mixing the material with water and extracting proteins from the material;
    (c) removing insoluble materials to produce a liquor;
    (d) heat treating the liquor at a temperature above 93° C.; and
    (e) subjecting the liquor to ultrafiltration using an ultrafiltration membrane having a molecular weight cutoff of up to 30,000 to provide a retentate;
    (f) optionally pasteurizing the retentate; and
    (g) drying the retentate to provide a soy protein concentrate.

2. The method of claim 1, wherein the ultrafiltration of said step (e) is conducted at a temperature of between about 25° C. and about 50° C.

3. The method of claim 1, wherein the soy protein concentrate includes a protein content of between about 70.0 wt. % and about 85.0 wt. % of total dry matter; an isoflavones content of at least about 2.0 mg/g of total dry matter; and a crude fiber content of less than about 3.0 wt. % of total dry matter.

4. The method of claim 1, wherein the soy protein concentrate includes a protein content of between about 70.0 wt. % and about 85.0 wt. % of total dry matter; a soyasapogenols content of at least about 2.0 mg/g of total dry matter; and a crude fiber content of less than about 3.0 wt. % of total dry matter.

5. The method of claim 1, wherein the ultrafiltration of said step (d) is conducted using an ultrafiltration membrane having a molecular weight cutoff of between about 10,000 and about 30,000.

6. The method of claim 1, wherein said step (b) further comprises adjusting the pH of the mixture to at least about 7.0.

7. The method of claim 1, wherein said step (b) further comprises adjusting the pH of the mixture to between about 7.0 and about 7.5.

8. The method of claim 1, wherein at least one of said steps (d) and (f) is conducted by jet cooking at a temperature above about 93° C.

9. The method of claim 1, wherein the mixture in said step (b) contains from about 5.0 wt. % to about 15.0 wt. % solids.

10. The method of claim 1, wherein the soy protein concentrate contains a combined raffinose and stachyose content of less than about 50.0 mg/g of total dry matter.

11. The method of claim 1, wherein the substantially defatted soybean material contains less than about 1.0 wt. % fat, and has a Protein Dispersibility Index ("PDI") of about 90.

12. The method of claim 1, wherein the substantially defatted soybean material contains about 30.0 wt. % to about 40.0 wt. % carbohydrates and about 5.0 wt. % to about 10.0 wt. % moisture.

13. A method for producing a soy protein concentrate, comprising the steps of:
    (a) providing a substantially defatted soybean material;
    (b) mixing the material with water and extracting proteins from the material;
    (c) removing insoluble materials to produce a liquor;
    (d) subjecting the liquor to ultrafiltration using an ultrafiltration membrane having a molecular weight cutoff of up to 30,000 at a temperature of between about 25° C. and about 5° C. to provide a retentate;
    (e) optionally pasteurizing the retentate; and
    (f) drying the retentate to provide a soy protein concentrate.

14. The method of claim 13, further comprising the additional step, prior to said step (d), of:
    heat treating the liquor at a temperature above about 93° C.

15. The method of claim 14, wherein at least one of said step (d) and said heat treatment step is conducted by jet cooking at a temperature above about 93° C.

16. The method of claim 13, wherein the soy protein concentrate includes a protein content of between about 70.0 wt. % and about 85.0 wt. % of total dry matter; an isoflavones content of at least about 2.0 mg/g of total dry matter; and a crude fiber content of less than about 3.0 wt. % of total dry matter.

17. The method of claim 13, wherein the soy protein concentrate includes a protein content of between about 70.0 wt. % and about 85.0 wt. % of total dry matter; a soyasapogenols content of at least about 2.0 mg/g of total dry matter; and a crude fiber content of less than about 3.0 wt. % of total dry matter.

18. The method of claim 13, wherein the ultrafiltration of said step (d) is conducted using an ultrafiltration membrane having a molecular weight cutoff of between about 10,000 and about 30,000.

19. The method of claim 13, wherein said step (b) further comprises adjusting the pH of the mixture to at least about 7.0.

20. The method of claim 13, wherein said step (b) further comprises adjusting the pH of the mixture to between about 7.0 and about 7.5.

21. The method of claim 13, wherein the mixture in said step (b) contains from about 5.0 wt. % to about 15.0 wt. % solids.

22. The method of claim 13, wherein the soy protein concentrate contains a combined raffinose and stachyose content of less than about 50.0 mg/g of total dry matter.

23. The method of claim 13, wherein the substantially defatted soybean material contains less than about 1.0 wt. % fat, and has a Protein Dispersibility Index ("PDI") of about 90.

24. The method of claim 13, wherein the substantially defatted soybean material contains about 30.0 wt. % to about 40.0 wt. % carbohydrates and about 5.0 wt. % to about 10.0 wt. % moisture.

* * * * *